United States Patent
Teranishi (10) Patent No.: US 7,022,416 B2
(45) Date of Patent: Apr. 4, 2006

(54) ARTICLE COATED WITH COATING FILM, AND FUNCTIONAL ARTICLE COATED WITH COATING FILM USING THE SAME

(75) Inventor: Toyoyuki Teranishi, Osaka (JP)

(73) Assignee: Nippon Sheet Glass Company, Limited, Minato-ku (JP)

( * ) Notice: Subject to any disclaimer, the term of this patent is extended or adjusted under 35 U.S.C. 154(b) by 164 days.

(21) Appl. No.: 10/479,142

(22) PCT Filed: Nov. 8, 2002

(86) PCT No.: PCT/JP02/11637

§ 371 (c)(1),
(2), (4) Date: Nov. 25, 2003

(87) PCT Pub. No.: WO03/039855

PCT Pub. Date: May 15, 2003

(65) Prior Publication Data

US 2004/0170844 A1 Sep. 2, 2004

(30) Foreign Application Priority Data

Nov. 8, 2001 (JP) .............................. 2001-343639
Dec. 18, 2001 (JP) .............................. 2001-384104

(51) Int. Cl.
- B32B 15/16 (2006.01)
- B32B 18/00 (2006.01)
- B32B 33/00 (2006.01)
- B05D 1/00 (2006.01)
- B05D 3/00 (2006.01)

(52) U.S. Cl. .................... 428/601; 428/613; 428/446; 428/448; 428/426; 428/432; 427/397.7; 427/430.1; 427/443.2

(58) Field of Classification Search ............... 428/687, 428/612, 613, 601, 446, 448, 451, 426, 428, 428/432; 427/430.1, 443.2, 397.7
See application file for complete search history.

(56) References Cited

U.S. PATENT DOCUMENTS 6,800,354 B1 * 10/2004 Baumann et al. ........... 428/141

FOREIGN PATENT DOCUMENTS

| EP | 0887179 | 12/1998 |
|---|---|---|
| JP | 6-025449 | 2/1994 |
| JP | 10-045429 | 2/1998 |
| JP | 11-286784 | 10/1999 |
| JP | 2000-144116 | 5/2000 |
| JP | 2001-017907 | 1/2001 |
| JP | 2001-207123 | 7/2001 |

* cited by examiner

*Primary Examiner*—Michael E. Lavilla
(74) *Attorney, Agent, or Firm*—Hamre, Schumann, Mueller & Larson, P.C.

(57) ABSTRACT

The present invention provides a film-coated article coated by a film having silicon oxide as a main component, in which recesses and projections conferring super hydrophobicity or super hydrophilicity are formed. This film includes minute projections and columnar projections, and the columnar projections are formed by local growth of the minute projections in a thickness direction of the film or formed with a plurality of minute particles constituting the minute projections laminated locally.

18 Claims, 2 Drawing Sheets

ARTICLE COATED WITH COATING FILM, AND FUNCTIONAL ARTICLE COATED WITH COATING FILM USING THE SAME

TECHNICAL FIELD

The present invention relates to film-coated articles coated by a film having silicon oxide as a main component and having minute recesses and projections, methods for manufacturing the same, and application solutions used for the same. The present invention is particularly useful for films that have silicon oxide as their main component and are formed through a sol-gel method.

The present invention also is related to functional film-coated articles and methods for manufacturing the same, and in particular is related to hydrophobic (water-repelling) film-coated articles and anti-soiling film-coated articles that use primer layers having silicon oxide as a main component and in which minute recesses and projections are formed.

BACKGROUND ART

The surfaces of glass sheets and other substrates can be made hydrophobic or hydrophilic by forming recesses and projections on the surfaces.

In general, the wettability of a solid surface is affected by the roughness of that surface. That is, the hydrophilicity of a rough surface increases if the solid surface is hydrophilic, whereas the hydrophobicity a rough surface increases if the solid surface is hydrophobic. This phenomenon is noticeable in a surface with a fractal structure, and thus because of this property a fractal surface can become a so-called super hydrophobic or super hydrophilic surface.

It should be noted that a hydrophobic state in which the contact angle of water exceeds 150° is generally referred to as "super hydrophobic", whereas a hydrophilic state in which even measurement of the contact angle of water is difficult is referred to as "super hydrophilic".

For example, (1) JP H06-25449A discloses a method of forming minute projections by subjecting the surface of a resin film to plasma processing and then chemically adsorbing fluorine compounds thereto.

(2) JP H11-286784A discloses a method of applying a treatment solution including polycondensates of metal alkoxides, minute metal oxide particles, and silane compounds having fluoroalkyl groups onto a glass surface and drying the treatment solution, thereby forming minute recesses and projections in its surface.

(3) JP 2000-144116A discloses a hydrophobic film formed by applying an application solution including tri-alkoxysilane polycondensates onto a substrate and then thermally processing the solution to form recesses and projections in its surface.

(4) JP 2001-17907A discloses a method of forming a film by applying a solution including an aluminum compound onto a substrate and then immersing the two in warm water to form fine recesses and projections on its surface.

(5) JP 2001-207123A discloses a method of applying a solution, in which metal alkoxides and substances that separate from the metal alkoxides in solvent and that have the characteristic of degrading, combusting, and sublimating from room temperature up to 700° C. are added to a solvent, to a substrate and performing thermal processing to form a fine porous layer with an average pore diameter of 100 nm to 2 μm.

However, with the methods disclosed above in (1), (2), and (5), the film thickness and/or the recesses and projections of the films are large. For this reason, transmitted light is scattered, which raises the haze value (ratio), and thus the film has low transparency.

Also, with the technologies disclosed in (3) and (5), thermal processing at elevated temperatures is necessary after the application solution has been applied to the substrate. Thus, the substrate is limited to materials with high thermal resistance. Thermal processing is necessary.

With the method disclosed in (1), the recesses and projections are formed through plasma processing, and thus a processing device for this is required.

With the method disclosed in (4), the recesses and projections are formed through warm water immersion, and thus a device for supplying warm water is necessary.

Moreover, with the technologies disclosed in (2), (3), (4), and (5), a wet application film is formed as a dip coating, for example, and then dried, and thus variations tend to occur in glass end portions and in the film surface, deteriorating the outward appearance of the film.

Furthermore, with the technologies disclosed in (1), (2), (3), (4), and (5), the recesses and projections of the film surface have an irregular fractal structure, and thus the film has poor abrasion resistance.

For example, in a hydrophobic substrate, the contact angle of water increases as more unevenness is formed in the surface to increase the roughness of the surface. When this angle of contact exceeds 150° the substrate exhibits super hydrophobicity sufficient to make it difficult for water droplets to remain on its surface. To exhibit this degree of super hydrophobicity, a shape that allows a large amount of air to be held between the surface recesses and projections and the water droplets is considered necessary.

However, light is scattered when the surface has large projections of several hundred nm or more, for example, and in the case of a transparent substrate, this generates haze and results in a loss of transparency.

Also, with conventional super hydrophobic surfaces, the projections of the surface were formed in complex fractal shapes. For this reason, there was the problem that the ability to repel water was quickly lost due to abrasion, for example.

DISCLOSURE OF INVENTION

The present invention provides a film-coated article coated by a film having silicon oxide as a main component, in which recesses and projections of a shape not found in conventional art are formed as minute recesses and projections conferring super hydrophobicity or super-hydrophilicity, a method for manufacturing the same, and an application solution used in the same.

The present invention also provides a method for manufacturing an article coated by a film having silicon oxide as a main component substantially without requiring a sintering step.

Further, the present invention provides a functional film-coated article that includes a primer film having silicon oxide as a main component. The primer film attains a balance between the minute recesses and projections and transparency. The present invention provides a method for manufacturing a functional film-coated article in which a functional film is applied onto the primer film without compromising the functionality of the primer film, which includes silicon oxide as a main component and has minute recesses and projections.

The film-coated article of the present invention includes a substrate and a film that contains silicon oxide as a main component and is formed on a surface of the substrate. The film includes minute projections and columnar projections, and the columnar projections are formed by local growth of the minute projections in a film thickness direction or are formed with a plurality of minute particles, constituting the minute projections, that are stacked locally on the film.

It is preferable that the local growth of the minute projections proceeds until it reaches at least two, and even more preferably at least three, times the average height of the minute projections. Here, "locally" is used specifically to mean a proportion occupying not more than 50% of the surface area of the film. As will be discussed later, the proportion of this area is more preferably a value that can be expressed interchangeably through the balance of two opposing properties (the balance between the surface roughness above a predetermined value and the haze value below a predetermined value). Moreover, "main component" is used here to mean a component that constitutes at least 50 weight percent.

The present invention provides a method for manufacturing a film-coated article that includes a substrate and a film containing silicon oxide as a main component formed on a surface of the substrate. The method includes: applying a solution including a silicon-containing material to a surface of the substrate; and maintaining a state where the substrate is wet with the solution for a time period sufficient for allowing formation of minute projections containing silicon supplied from the silicon-containing material and columnar projections on the surface of the substrate. The columnar projections are formed by local and irregular growth of the minute projections in a film thickness direction or formed with a plurality of minute particles, constituting the minute projections, that are stacked locally on the surface of the film.

In another aspect, the present invention also provides a functional film-coated article and method for manufacturing the same. The functional film-coated article of the present invention includes a functional film, such as a hydrophobic film or an anti-soiling film, formed on the surface of the film of the aforementioned film-coated article. A method for manufacturing a functional film-coated article according to the present invention is characterized in that the above manufacturing method is performed and then a solution for forming a functional film, such as a hydrophobic film or an anti-soiling film, is applied onto the surface of the film of film-coated article, which serves as a primer film.

It is a further aspect of the present invention to provide a solution to be applied for forming a film, including a solvent containing silicone oil as a main component and a chlorosilyl-group-containing compound dissolved in the solvent.

PREFERRED EMBODIMENTS OF THE INVENTION

The film of the film-coated article of the present invention has microscopic unevenness. This unevenness in principle is made of minute projections (granular projections) and columnar projections that are higher than the granular projections when measured from the surface of the substrate.

The columnar projections are formed in single units, for example. That is, they are integrated projections formed by irregular growth of minute particles growing irregularly in the thickness direction of the film. The columnar projections also may be formed by stacking minute particles on one another. There are no particular limitations with respect to the number and the configuration of the stacked layers of minute particles; however, it is preferable that projections formed by layering two or more minute particles in the thickness direction of the film protrude from the periphery, and more specifically, it is preferable that the columnar projections are contiguous bodies constituted by three or more minute particles in the thickness direction of the film, and whose periphery is surrounded by minute projections that in principle are the height of a single minute particle.

When Dc is the diameter of the columnar projections and H is their height, $2 Dc \leq H$ and preferably $3 Dc \leq H$. Here, values that are measured by SEM may be used for Dc and H. Dc is preferably 10 nm to 200 nm, and the preferable range of H is normally 50 nm or more, although this depends on the value of Dc.

The columnar projections of the film of the present invention may be a mixture of integral projections and projections formed by stacking minute particles.

In this film, there are minute projections (granular projections) around the columnar projections. The diameter Dp of the minute projections is preferably 5 nm to 200 nm.

It is preferable that the surface roughness of the film has an arithmetic roughness average (Ra) of at least 10 nm and that the haze value of the film is not more than 1%. The ability to realize a certain amount of surface roughness while maintaining a low haze value, that is, while maintaining high transparency, depends on the dispersion of columnar projections among the granular projections, which is a characteristic feature of the film of the present invention.

Hydrophilicity is another property that can be attained in the film of the present invention due to its characteristic shape. With the present invention, it is possible to make the contact angle of water, which is measured by dropping 1 mg droplets of water onto the surface of the film, equal to or less than 5°.

The functional film that is further layered on the film is a hydrophobic film or an anti-soiling film. However, it also is possible to achieve both hydrophobicity and anti-soiling properties in the same film by using a film that contains fluorine, for example (the hydrophobic film referred to in the specification may have anti-soiling properties, and vice versa).

One example of a hydrophobic film is an organic film that includes fluoroalkyl groups, and an example of an anti-soiling film is an organic film that includes polyalkyleneoxy groups.

With the present invention, the functional film can be made a hydrophobic film by setting the contact angle of water, which is measured by dropping 2 mg of water droplets onto the surface of the film, to at least 150°.

With the method for manufacturing a film having minute recesses and projections, a chlorosilyl-group containing compound may be used as the silicon-containing raw material. The concentration of the chlorosilyl-group containing compound in solution is preferably 0.01 to 10 weight percent. Tetrachlorosilane, for example, can be used as the chlorosilyl-group containing compound.

The solvent of the solution is preferably a nonaqueous solvent, such as a nonaqueous solvent including silicone oil, and more specifically may be a solvent having silicone oil as its main component. There are no particular limitations with respect to the silicone oil, and for example dimethylsilicone oil can be used as the silicone oil. The amount of water that is included in the nonaqueous solvent, such as a solvent having silicone oil as its main component, is preferably limited to not more than 0.03 weight percent.

The application solution including the silicon-containing compound is applied to the surface of the substrate, the substrate surface is kept wetted for a predetermined amount of time, and if necessary, the application solution is removed from the substrate surface. The resulting product has an uneven surface that includes columnar projections. The substrate surface preferably is wetted for at least one second, more preferably for at least five seconds, particularly preferably for at least 10 seconds, and especially preferably for at least one minute, although this depends on other conditions as well.

During this period, grain-shaped seeds are created in the substrate surface and grow into columnar projections. Alternatively, a plurality of grains created in solution are adsorbed to the substrate in a state where they are laminated to one another, constituting at least a part of the columnar projections.

The solution may be applied at room temperature. The preferable environment for application is for example a temperature of 10° C. to 40° C. and a relative humidity (RH) of 15 to 60%. At a minimum, the temperature and the RH should be regulated because they significantly affect the unevenness of the film.

Conventional methods can be adopted to form the functional film without any particular restrictions. However, the solution for forming this functional film preferably is applied to the above-mentioned film, which serves as a primer film, without any mechanical contact. Here, "mechanical contact" is used to refer to direct contact between the film and the device applying the solution.

It also is possible to apply an application solution for forming the film serving as the primer onto the substrate surface, and with the substrate wetted with the application solution, to apply a solution for forming a functional film. The solution for forming the functional film depends on the purpose of the film, and for example, it is possible to use a solution including a compound containing a fluoroalkyl group or a solution including a compound containing a polyalkyleneoxy compound.

In the present invention, minute granular projections are formed in the surface of a film having silicon oxide, such as silica, as its main component. Columnar projections also are formed by growing the microparticles making up these granular projections in a such a manner that they are stacked on one another, or by growing them in a single unit from the primer surface. Forming projections that have different shapes in this fashion increases the surface roughness and also results in a structure in which air can be held between individual columnar projections and between columnar projections and granular projections.

When force is applied to this film surface, the granular projections are unlikely to be damaged, even if the columnar projections are destroyed. For this reason, there is superior durability (anti-abrasion properties) than with conventional super hydrophobic articles, as hydrophobicity is maintained even if super hydrophobicity is lost.

Columnar projections include projections that are grown from the primer surface and are formed in a single unit, and those formed by the grains being stacked on one another. This difference emerges due to the conditions under which the film is formed. For example, if there is a high concentration of chlorosilyl-group containing compounds, then there is a tendency for projections in which grains are stacked on one another to form. However, regardless of the configuration of the projections, there is no noticeable difference in their super hydrophobicity, super hydrophilicity, or durability.

When the average diameter Dp of the granular projections is set to 20 nm to 100 nm and the average diameter Dc of the columnar projections is set to 20 to 100 nm, the haze value easily can be kept low. For this reason, it is easy to strike a balance between a structure with microscopic recesses and projections that has been afforded super hydrophobicity or super hydrophilicity and the transparency of the film.

Since the columnar projections are allowed to grow naturally, they do not necessarily grow only perpendicular to the substrate surface, and there are also those that bend at an intermediate portion thereof in the lateral direction or those that grow obliquely from the start. However, projections formed in this manner do not result in problems.

With conventional technologies, methods that were often employed consisted of forming a flat surface first and then carrying out plasma processing, warm-water processing, and/or high temperature sintering, for example, to form recesses and projections in that surface. With these methods, however, not only were equipment costs expensive but there was also a limitation as to the substrate in which the recesses and projections were formed. For example, these methods were substantially impossible to adopt for glass sheets attached to a vehicle.

On the other hand, with the method of the present invention, a coating solution is applied to a substrate surface and that solution is either forcibly dried or allowed to dry naturally, and thus the substrate or the state thereof is not restricted.

The surface roughness of the film has an arithmetic mean roughness value (Ra) of preferably at least 10 nm, and the haze value of the film is preferably not more than 1.0% and even more preferably not more than 0.5%.

The greater the surface roughness, the more the hydrophobicity and the hydrophilicity can be increased. On the other hand, uneven surfaces formed through conventional technologies had the problem that the haze value increased as the surface roughness increased, making it difficult to achieve both transparency and hydrophobicity or hydrophilicity.

Since a film with silicon oxide as its main component is hydrophilic, in principle the primer film of the present invention exhibits super hydrophilicity in concert with its structure of microscopic recesses and projections.

This film may include silicon oxide as its main component, and may also include other components, such as titanium oxides, aluminum oxides, and zirconium oxides.

Hereinafter, methods for manufacturing a film with silicon oxide as its main component are described using an example in which a solution in which a compound containing chlorosilyl-groups is dissolved in a solvent having silicone oil as its main component is applied to a substrate surface (see FIG. 3).

Figure 3A:
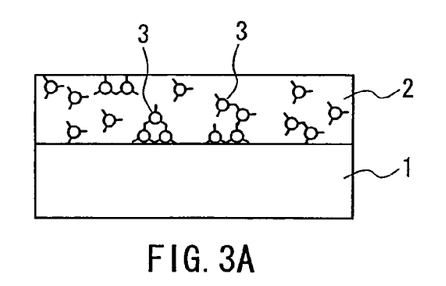
FIG. 3A to FIG. 3D are schematic views describing the mechanism through which the minute recesses and projections are formed.

In this solution, the chlorosilyl-group containing compounds are dissolved in a solvent with their chloro groups intact.

When this solution 2 is applied to the surface of a substrate 1, the chlorosilyl-group containing compounds bind to the hydrophilic groups (—OH group) of the substrate surface during application. Moreover, the chlorosilyl-group containing compounds bind to the substrate surface after undergoing hydrolysis and condensation polymerization due to ambient moisture and water adsorbed to the substrate surface. In this way, granular seeds 3 are formed scattered across the substrate surface (see FIG. 3A).

Then, when the substrate surface is wetted by the application solution, the chlorosilyl-group containing compounds proceed from hydrolysis with the ambient moisture to a condensation reaction, creating oligomers of silicon oxide. Once these oligomers have grown to a size where they do not dissolve in the solvent easily, they start to precipitate out of the solvent, and the oligomers 4 that have precipitated accumulate and grow as projections (FIG. 3B).

Also, when silanol (Si—OH group) is formed on the surface of the seeds 3 formed on the substrate surface, it binds the chlorosilyl-group containing compounds 5. The oligomers 6 also bind the Si—Cl or Si—OH groups of the surface with recesses and projections before precipitating, and projections are grown from the surface as well (FIG. 3C).

Figure 3B:
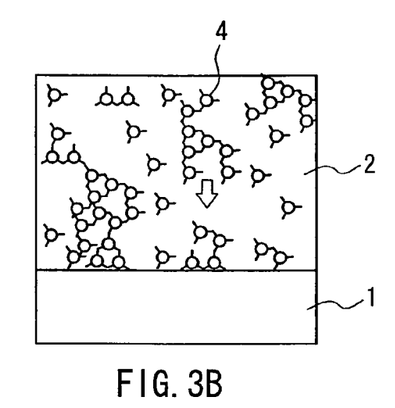
Figure 3C:
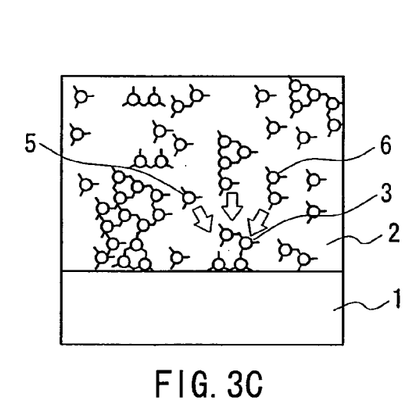
Figure 3D:
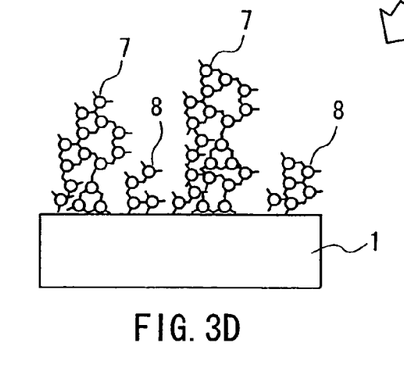

Due to the sedimentation processes shown in FIG. 3B and FIG. 3C, granular projections 8 and columnar projections 7 are formed on the surface of the substrate 1 (FIG. 3D).

Since projections grow easily at spots that protrude from the substrate surface, most likely the growth of the columnar projections is concentrated at the seeds that are formed immediately after application.

It is likely that the difference between the projections grown from the substrate surface and formed in a single unit and the projections that are formed as grains pile on one another is due to the ratio of the amount of precipitated oligomers that are accumulated and the amount of dissolved raw material that precipitates directly onto the substrate surface, and on the density of the seeds that are formed immediately after application.

As described above, the formation of the film is likely significantly affected by the formation of oligomers and their reaction with the raw material and the substrate, and the extent to which the oligomers are dissolved with respect to the solvent, for example.

There are no particular limitations to the raw material containing silicon as long as it is capable of forming oligomers containing silicon oxides and it is a material that is highly reactive with the substrate and dissolves in the solvent. However, a chlorosilyl-group containing compound preferably is used because chloro-groups exhibit high reactivity with water and the hydrophilic groups (—OH groups) of the substrate surface.

The solvent preferably does not inhibit the reactivity of the raw material (solute) and is difficult for the oligomers to dissolve in. For example, a water-based solvent is not preferable because the chlorosilyl-group containing compound reacts with water. A nonaqueous solvent is one possibility as a solvent that allows the highly reactive chloro groups to remain intact, and among nonaqueous solvents, those including silicone oil as a main component are preferable.

For example, as a nonaqueous solvent that is not a solvent including silicone oil as a main component, a chlorosilyl-group containing compound was dissolved in an isoparaffin-based hydrocarbon and applied to the substrate surface. The film that was subsequently obtained included some projections; however, projections that grew into columnar projections did not form. As a result, the film did not exhibit super hydrophilicity. This is likely due to the differences in moisture absorptivity between nonaqueous solvents.

Next, the effects of the reactivity of the silicon oxide raw material were assessed. The process of applying an application solution, in which a chlorosilyl-group containing compound is dissolved in a solvent including silicone oil as a main component, to the substrate surface was performed in a low humidity environment at a temperature of 20° C. and with a relative humidity (RH) of 10%, for example.

The result was that although granular projections were formed, columnar projections did not form. This can be surmised to be due to the difficulty of the reaction proceeding in a low humidity environment with little moisture because the chlorosilyl-group containing compound reacts with the moisture in the air, and thus projections that grew into columnar projections did not form.

Conversely, when this application liquid is applied to the substrate surface in a high humidity environment at a temperature of 30° C. and a relative humidity (RH) of 70%, for example, the reaction proceeded too quickly, forming projections large enough to turn the film white.

In another example, a solution in which a chlorosilyl-group containing compound was dissolved in a solvent including silicone oil as its main component after the solvent was allowed to absorb water in advance was applied to the substrate surface. The resulting film included granular particles but not columnar particles.

When the water content of the solvent was measured at this time it was found to be 0.035 weight percent, and it was determined that the water content of a solvent including silicone oil as a main component according to the present invention is preferably not more than 0.03 weight percent. This can be surmised to be due to the effects of the chlorosilyl-group containing compound undergoing hydrolysis and condensation with the water in the solvent and becoming oligomers in the solution.

In other words, it is conceivable that when a solution in which a chlorosilyl-group containing compound is dissolved and the solvent includes silicone oil as its main component with little water is applied to the substrate surface, the solution suitably absorbs ambient moisture while the solution is applied and the substrate surface is wet with the solution. This appropriate water absorption allows oligomerization of the chlorosilyl-group containing compound suitably, resulting in forming both granular and columnar projections.

To form granular and columnar projections on a substrate surface, ordinarily it is necessary for the substrate surface to be wetted by the solution for at least one second after the solution has been applied to the substrate surface, and it is further preferable that the substrate surface is wetted for at least one minute.

When the substrate surface is wetted for a short time only, the chlorosilyl-group containing compound is not adequately adsorbed to the substrate surface, and thus a film having a structure of microscopic recesses and projections that confers super hydrophobicity or super hydrophilicity cannot be obtained.

Also, in order to supply additional amount of the chlorosilyl-group containing compound, which naturally adsorbs to and forms layers on the substrate surface, the same solution is preferably applied a second time after it has been applied to the substrate surface for a first time. When the solution is supplied in two or more coatings, subsequent coatings can be supplied before the first application of the solution has dried completely, so that the total time during which the substrate is wetted by the solution is at least a predetermined amount of time, for example, at least one second.

The concentration of the chlorosilyl-group containing compound is preferably 0.01 to 10 weight percent and more preferably 0.1 to 3 weight percent, although this also differs depending on the application method.

When the concentration of the chlorosilyl-group containing compound is too high, the film becomes thick and turns into a white powder, and this is not preferable. On the other hand, when the concentration of the chlorosilyl-group containing compound is too low, the film does not have adequate thickness. As a result, a structure of microscopic recesses and projections that confers super hydrophobicity or super hydrophilicity cannot be formed, and thus this is not preferable.

With respect to the application method, it is necessary that the application solution wets the substrate surface evenly, and moreover, after it has been applied it is preferable that the substrate surface stays wetted by the application solution without there being mechanical contact with the substrate surface.

Specific examples of the application method include a flow coating method, a dip coating method, a curtain coating method, a spin coating method, a spray coating method, a bar coating method, and an immersion and adsorption method. Of these methods, a flow coating method and a spray coating method are preferable because they allow efficient application.

The chlorosilyl-group containing compound is a compound that includes at least one chlorosilyl-group (—$SiCl_nX_{3-n}$, where n is 1, 2, or 3, and X is hydrogen or an alkyl group, alkoxy group, or acyloxy group with a carbon number of 1 to 10) within the molecule.

Of these, a compound that includes at least two chlorine atoms is preferable, and a chlorosilane in which at least two of the hydrogen atoms of silane $Si_nH_{2n+2}$ (wherein n is an integer of 1 to 5) are substituted with chlorine atoms and the other hydrogen atoms are substituted with an alkyl group, an alkoxy group, or an acyloxy group where necessary, and partial hydrolyzates and condensates thereof, are preferable. Possible examples thereof include tetrachlorosilane ($SiCl_4$), trichlorosilane ($SiHCl_3$), trichloromonomethylsilane ($SiCH_3Cl_3$), dichlorosilane ($SiH_2Cl_2$), and Cl—($SiCl_2O$)n-$SiCl_3$ (wherein n is an integer of 1 to 10). Any of these may be used alone or a plurality thereof may be used in combination, but the most preferable chlorosilyl-group containing compound is tetrachlorosilane.

The solvent having silicone oil as its main component is preferably made of acyclic and/or cyclic dimethyl silicone oil. Examples thereof include hexamethyldisiloxane, octamethyltrisiloxane, decamethyltetrasiloxane, octamethylcyclotetrasiloxane, and decamethylcyclopentasiloxane. These may be used alone or a plurality thereof may be used in combination.

The environment for the application process is preferably a temperature of 10° C. to 40° C. and a relative humidity (RH) of 15% to 60%, and more preferably is a temperature of 15° C. to 25° C. and a relative humidity (RH) of 20% to 40%. Columnar projections are not formed as described above when the temperature and the humidity are too low.

On the other hand, when the humidity is too high, the projections become massive, lowering the transparency of the formed film. Also, when the temperature is too high, the solution that is applied to the substrate surface dries too quickly, making it difficult to keep the substrate surface in a wetted state.

There are no particular limitations as to the substrate, but it is preferable that a material that has hydrophilic groups in its surface is used. Specific examples thereof include glass, ceramic, resin, and metal.

If there are few hydrophilic groups on the surface of these substrates, then the surface may be made hydrophilic by processing it in advance in a plasma or corona atmosphere including oxygen. Alternatively, the solution may be applied after the substrate surface has been provided with hydrophilicity by irradiating ultraviolet radiation of a wavelength near 200 to 300 nm in an atmosphere including oxygen.

A case in which a hydrophobicity film is formed as the functional film is described next. There are no particular limitations as to the hydrophobic solution that can be adopted, and it is necessary only that it include a hydrophobic material that binds to the substrate surface. It should be noted that generally it is preferable to use the hydrophobic material in the form of a solution in which the hydrophobic material has been dissolved in the solvent.

Examples of a hydrophobic group that exhibits hydrophobicity include a fluoroalkyl group or an alkyl group. The hydrophobic material is preferably a silane compound that includes a fluoroalkyl group or an alkyl group and that includes a hydrolysable group that matches well with the chlorosilyl-group formed in advance on the substrate surface. Examples of the hydrolysable group include an alkoxy group, an acyloxy group, and a chlorine group. For silane compounds including these hydrolysable groups, it is possible to use hydrolyzates that are partially hydrolyzed and polymers that have been polymerized by condensation. Of these, a silane compound including fluoroalkyl groups, which have excellent hydrophobicity, is especially preferable.

Examples of the fluoroalkyl group-containing silane compounds include silane compounds that contain a fluoroalkyl group and that also contain an alkoxy group, an acyloxy group, or a chlorine group. Possible examples include $CF_3(CF_2)_7(CH_2)_2Si(OCH_3)_3$, $CF_3(CF_2)_5(CH_2)_2Si(OCH_3)_3$, $CF_3(CF_2)_7(CH_2)_2SiCl_3$, and $CF_3(CF_2)_5(CH_2)_2SiCl_3$.

Any of these can be used alone or a plurality thereof can be used in combination. However, $CF_3(CF_2)_7(CH_2)_2SiCl_3$ is most preferable because of its particularly high reactivity and hydrophobicity.

There are no particular limitations with respect to the solvent in which the hydrophobic material is dissolved. However, a chlorosilyl-group containing compound that is formed on the substrate first is applied by being dissolved in a solvent having silicone oil as its main component, and thus the hydrophobic agent that is applied afterwards is preferably a nonaqueous solvent, which belongs to the same group.

Examples of the nonaqueous solvent include paraffin-based hydrocarbons, fluorocarbon-based solvents, and solvents with silicone oil as a main component. Of these, solvents with silicone oil as a main component are preferable because such solvents are the same as the solvent in which the chlorosilyl-group containing compound that is formed on the substrate surface first is dissolved.

With regard to the method for applying the hydrophobic solution, it is necessary that the surface structure of the film with recesses and projections formed first is not destroyed. More specifically, it is preferable that the hydrophobic solution is adsorbed in the same manner as the chlorosilyl-group containing compound that is formed first.

To adsorb the hydrophobic solution, it is necessary for the substrate surface to be wetted by the hydrophobic solution for at least 0.1 seconds after the hydrophobic solution is applied.

With respect to the hydrophobic solution, it is sufficient that a single layer of the hydrophobic material is bonded, unlike the chlorosilyl-group containing compound of the film with recesses and projections that is formed first, and thus the period during which the substrate is wetted by the hydrophobic solution can be shorter than the period during which the chlorosilyl-group containing compound is allowed to adhere naturally to and form layers on the substrate surface.

However, when this period is less than 0.1 seconds, the hydrophobic material is not adequately adsorbed, and thus suitable hydrophobicity cannot be exhibited.

With respect to the method for applying the functional films, the solution for forming the functional film may be applied avoiding mechanical contact with the primer film, so that the minute recesses and projections of the primer film formed first are not destroyed. More specifically, the method for applying the functional film can be a flow coating method, a dip coating method, a curtain coating method, a spin coating method, a spray coating method, a bar coating method, and an immersion and adsorption method. Of these methods, a flow coating method and a spray coating method are preferable because they allow efficient application.

An anti-soiling film also may be formed as a functional film. The anti-soiling film is preferably an organic film including polyalkyleneoxy groups.

It should be noted that the film having silicon oxide as its main component according to the present invention is characterized in that it also has low reflectivity due to the effects of its low refractive index and its surface unevenness. If this film is used, it is possible to lower the reflectance measured from the film side to less than the reflectance before the film is formed.

EXAMPLES

In the following description, "silica" does not strictly refer to objects in the state of $SiO_2$, and is used simply to mean to silicon oxide.

Example 1

Formation of a Film Having Silica as its Main Component

Example 1-1

While stirring, 0.5 g of tetrachlorosilane ($SiCl_4$; made by Shin-Etsu Silicones) was added to 99.5 g of decamethylcyclopentasiloxane (KF-995; made by Shin-Etsu Silicones), yielding a coating solution for a silica film in which to form recesses and projections. A soda-lime glass sheet obtained through a float method was used as the glass substrate.

This solution for a silica film in which to form recesses and projections was applied onto the surface of a washed glass substrate at a relative humidity of 30% and at room temperature using flow coating, and for a period of one minute the glass substrate surface wetted by this solution was left still. The same solution was then applied a second time using flow coating, and for a period of one minute the glass substrate surface wetted by this solution was left still. Then, the solution was completely washed away with ethanol and drying was allowed to occur naturally, yielding a glass substrate coated with a silica film having recesses and projections.

Figure 1:
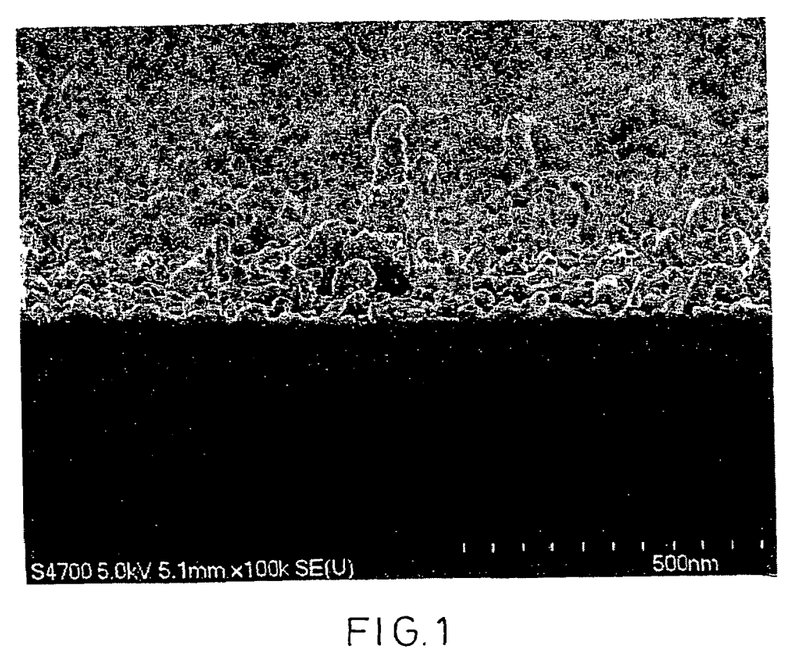
FIG. 1 is a diagram showing the film having silicon oxide as a main component obtained in Example 1-1 as observed by a scanning electron microscope (SEM).

The surface configuration of the glass substrate coated with a silica film having recesses and projections that was obtained in this manner was observed using a scanning electron microscope (SEM) "S-4700 model" manufactured by Hitachi Seisakusho Inc., under the following conditions: acceleration voltage of 5 kV, emission current of 10 µA, slope angle of 10°, zoom factor of 100,000 times magnification (see FIG. 1). It is clear from the results of FIG. 1 that minute granular projections and columnar projections were formed in the silica film surface.

From FIG. 1 it is clear that the columnar projections were constituted by microparticles grown irregularly in the film thickness direction of the film, and more specifically had a shape in which they grew to two or three times or more the average height of the minute projections made of microparticles. The columnar projections were formed on less than half the area of the overall region, and the remainder was covered by minute projections. The height H of some of the columnar projections from the substrate surface was found to be at least three times their average diameter Dc. H, Dc, and the diameter Dp of the minute projections were within the above-mentioned preferable range. The average value of Dp and Dc were both within the range of 20 nm to 100 nm.

With respect to the surface roughness of the glass substrate coated with the silica film having recesses and projections, the arithmetic mean roughness value Ra was measured using an atomic force microscope (AFM), "SPI3700" manufactured by Seiko Instruments Inc., in cyclic contact mode. It was observed that the larger the value of the Ra, the greater the unevenness of the film surface.

Next, the hydrophilicity of the glass substrate coated with the silica film having recesses and projections was evaluated through the contact angle of water. Using a contact angle meter "CA-DT" made by Kyowa Interface Science Co., Ltd., 1 mg of water droplets was dropped onto the surface of the glass substrate, and the passive contact angle was measured. It should be noted that it was found that the smaller the value of the contact angle, the greater the hydrophilicity.

The transparency of the glass substrate coated with the silica film having recesses and projections was evaluated using the haze value. The haze value was measured using a direct reading haze computer "HGM-2DM" manufactured by Suga Test Instruments Co., Ltd. The smaller the haze value, the higher the transparency of the film.

As shown above, with the method for forming a film having silica as its main component according to the present invention, natural drying alone is sufficient, and a sintering process is not particularly necessary.

Example 1-2

A solution for a silica film in which to form recesses and projections that was prepared in the same manner as in Example 1-1 was applied onto the surface of a washed glass substrate at a relative humidity of 30% and at room temperature using flow coating, and for a period of one minute the glass substrate surface wetted by this solution was left still. Then, the solution for a silica film in which to form recesses and projections of the glass substrate surface was completely washed away with ethanol and drying was allowed to occur naturally, yielding a glass substrate coated with a silica film having recesses and projections.

Example 1-3

A solution for a silica film in which to form recesses and projections that was prepared in the same manner as in Example 1-1 was applied onto the surface of a washed glass substrate at a relative humidity of 30% and at room temperature using flow coating, and for a period of ten seconds the glass substrate surface wetted by this solution was left still. Then, the solution for a silica film in which to form recesses and projections of the glass substrate surface was completely washed away with ethanol and drying was allowed to occur naturally, yielding a glass substrate coated with a silica film having recesses and projections.

Example 1-4

A solution for a silica film in which to form recesses and projections that was prepared in the same manner as in Example 1-1 was applied onto the surface of a washed glass substrate at a relative humidity of 30% and at room temperature using flow coating, and for a period of 0.5 seconds the glass substrate surface wetted by this solution was left still. The same solution was then applied a second time using flow coating, and for 0.5 seconds the glass substrate surface wetted by this solution was left still. Then, the solution for a silica film in which to form recesses and projections of the glass substrate surface was completely washed away with ethanol and drying was allowed to occur naturally, yielding a glass substrate coated with a silica film having recesses and projections.

Example 1-5

While stirring, 0.2 g of tetrachlorosilane (SiCl$_4$; made by Shin-Etsu Silicones) was added to 99.8 g of decamethylcyclopentasiloxane (KF-995; made by Shin-Etsu Silicones), yielding a coating solution for a silica film in which to form recesses and projections.

This solution for a silica film in which to form recesses and projections was applied onto the surface of a washed glass substrate at a relative humidity of 30% and at room temperature using flow coating, and for a period of one minute the glass substrate surface wetted by this solution was left still. The same solution was then applied a second time using flow coating, and for a period of one minute the glass substrate surface wetted by this solution was left still. Then, the solution for a silica film in which to form recesses and projections of the glass substrate surface was completely washed away with ethanol and drying was allowed to occur naturally, yielding a glass substrate coated with a silica film having recesses and projections.

Example 1-6

While stirring, 1.0 g of tetrachlorosilane (SiCl$_4$; made by Shin-Etsu Silicones) was added to 99.0 g of decamethylcyclopentasiloxane (KF-995; made by Shin-Etsu Silicones), yielding a coating solution for a silica film in which to form recesses and projections.

This solution for a silica film in which to form recesses and projections was applied onto the surface of a cleaned glass substrate at a relative humidity of 30% and at room temperature using flow coating, and for a period of one minute the glass substrate surface wetted by this solution was left still. Then, the solution for a silica film in which to form recesses and projections of the glass substrate surface was completely washed away with ethanol and drying was allowed to occur naturally, yielding a glass substrate coated with a silica film having recesses and projections.

Example 1-7

A glass substrate coated with a silica film having recesses and projections was obtained in the same manner as in Example 1-1 except that the decamethylcyclopentasiloxane of Example 1-1 was changed to octamethyltrisiloxane (KF-96L-1CS; made by Shin-Etsu Silicones).

Example 1-8

The solution for a silica film in which to form recesses and projections that is prepared in the same manner as in Example 1-1 was applied onto the surface of a cleaned glass substrate at a relative humidity of 30% and at room temperature using spray coating, and for a period of one minute the glass substrate surface wetted by this solution was left still. Then, the solution for a silica film in which to form recesses and projections of the glass substrate surface was completely washed away with ethanol and drying was allowed to occur naturally, yielding a glass substrate coated with a silica film having recesses and projections.

Example 1-9

While stirring, 2.0 g of tetrachlorosilane (SiCl$_4$; made by Shin-Etsu Silicones) were added to 98.0 g of decamethylcyclopentasiloxane (KF-995; made by Shin-Etsu Silicones), yielding a solution for a silica film in which to form recesses and projections.

This solution for a silica film in which to form recesses and projections was applied onto the surface of a cleaned glass substrate at a relative humidity of 30% and at room temperature using flow coating, and for a period of five minutes the glass substrate surface wetted by this solution was left still. The same solution was then applied a second time using flow coating, and for a period of five minutes the glass substrate surface wetted by this solution was left still. Then, the solution for a silica film in which to form recesses and projections of the glass substrate surface was completely washed away with ethanol and drying was allowed to occur naturally, yielding a glass substrate coated with a silica film having recesses and projections.

Figure 2:
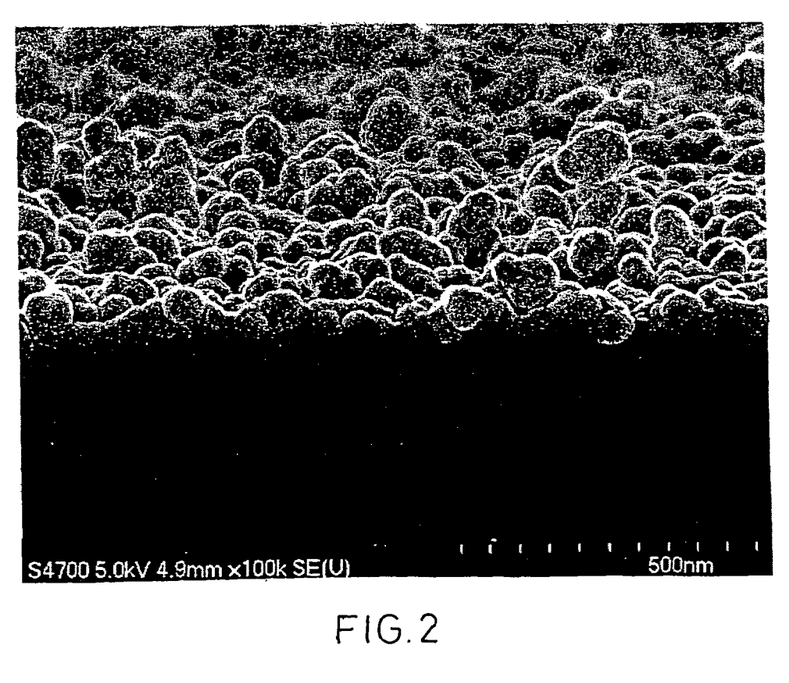
FIG. 2 is a diagram showing the film having silicon oxide as a main component obtained in Example 1-9 as observed by a scanning electron microscope (SEM).

The surface configuration of the glass substrate coated with a silica film having recesses and projections that was obtained in this manner was assessed using a scanning electron microscope under the same conditions as in Example 1-1 (see FIG. 2). It is clear from the results of FIG. 2 that the columnar projections in Example 1-9 are made of grains that are stacked on top of one another. These columnar projections included those in which microparticles were locally stacked three or more levels high and which stand up as projections at least two levels of microparticles higher than surrounding microparticles.

Here as well, the columnar projections were formed on less than half the area of the overall region, and the remainder was coated by minute projections. The height H of some of the columnar projections from the substrate surface was found to be at least three times their average diameter Dc. H, Dc, and the diameter Dp of the minute projections were within the above-mentioned preferable range. The average value of Dp and Dc were both within the range of 20 nm to 100 nm.

Example 1-10

A glass substrate coated with a silica film having recesses and projections was obtained in the same manner as in Example 1-1, except that the relative humidity was changed to 20% when the solution for a silica film in which to form recesses and projections that was prepared in the same manner as in Example 1-1 was applied onto the surface of the cleaned glass substrate.

Example 1-11

A glass substrate coated with a silica film having recesses and projections was obtained in the same manner as in Example 1-1, except that the relative humidity was changed to 50% when the solution for a silica film in which to form recesses and projections that was prepared in the same manner as in Example 1-1 was applied onto the surface of the cleaned glass substrate.

TABLE 1

| Sample | Surface Roughness (Ra) | Contact Angle (°) | Haze Value (%) |
|---|---|---|---|
| Example 1-1 | 17 nm | ≦5 | 0.3 |
| Example 1-2 | 15 nm | ≦5 | 0.2 |
| Example 1-3 | 13 nm | ≦5 | 0.2 |
| Example 1-4 | 14 nm | ≦5 | 0.3 |
| Example 1-5 | 13 nm | ≦5 | 0.1 |
| Example 1-6 | 22 nm | ≦5 | 0.4 |
| Example 1-7 | 16 nm | ≦5 | 0.2 |
| Example 1-8 | 21 nm | ≦5 | 0.4 |
| Example 1-9 | 24 nm | ≦5 | 0.3 |
| Example 1-10 | 15 nm | ≦5 | 0.1 |
| Example 1-11 | 27 nm | ≦5 | 0.7 |

When the surface shape of the glass substrates coated with a silica film having recesses and projections obtained in Examples 1-1 through 1-11 was observed with a scanning electron microscope, it was possible to confirm that minute granular projections and columnar projections were formed in each of the films.

Moreover, when the surface roughness of the glass substrates coated with a silica film having recesses and projections obtained in Examples 1-1 through 1-11 was measured with an atomic force microscope, it was possible to confirm that the Ra was at least 13 nm in each of the films. As a result, it was ascertained that the films had a large surface roughness.

The water wettability was also observed for the glass substrates coated with a silica film having recesses and projections obtained in Examples 1-1 through 1-11, and it was confirmed that the water droplets wetted each of the films well and dispersed. The hydrophilicity of the silica films with recesses and projections was also evaluated by the contact angle of the water. The contact angle was too small to be measured precisely, but it was approximately 5 degrees or less.

The transparency of the glass substrates coated with a silica film having recesses and projections obtained in Examples 1-1 through 1-11 was measured with a direct reading haze computer, and it was found that the transparency was high, with the haze value of each of the films being 1.0% or less. Moreover, it also was found that the films were very free of defects, lacking external imperfections such as irregularities in the film surface and solution buildup at the glass edge portions. The films also were found to be neutral for both transmitted color and reflected color, lacking external flaws.

Compared to a glass substrate on which a film having silica as its main component is not formed, the glass substrates coated by a film having silica as its main component according to the present invention showed a reduction in film surface reflectance of approximately 1.6%. This is likely due to the effects of the film with silica as a main component having a lower refractive index than a soda-lime glass substrate, whose refractive index is 1.52, and the effects of the recesses and projections in the film surface.

Example 2

Providing Hydrophobicity

As a second Example of the present invention, the glass substrates coated with a silica film having recesses and projections according to the present invention were further provided with hydrophobicity.

There are no particular limitations regarding the hydrophobic solution that can be adopted in Example 2, as long as it includes a hydrophobic material that binds to the substrate surface. It should be noted that generally it is preferable that the hydrophobic material is used in the form of a solution in which the hydrophobic material has been dissolved in the solvent. The hydrophobic material is preferably a compound that includes hydrolysable groups that match well with the chlorosilyl-group containing compound formed on the substrate surface first, and among such compounds, a silane compound including fluoroalkyl groups, which have excellent hydrophobicity, is especially preferable.

Silane compounds containing fluoroalkyl groups are silane compounds including fluoroalkyl groups and also alkoxy groups, acyloxy groups, or chlorine groups, and possible examples thereof include $CF_3(CF_2)_7(CH_2)_2Si(OCH_3)_3$, $CF_3(CF_2)_5(CH_2)_2Si(OCH_3)_3$, $CF_3(CF_2)_7(CH_2)_2SiCl_3$, and $CF_3(CF_2)_5(CH_2)_2SiCl_3$.

Any of these can be used alone or a plurality thereof can be used in combination, however, $CF_3(CF_2)_7(CH_2)_2SiCl_3$ is most preferable because of its particularly high reactivity and hydrophobicity.

There are no particular limitations with respect to the solvent in which the hydrophobic material is dissolved, and it is sufficient for it to dissolve the hydrophobic material. However, a chlorosilyl-group containing compound that is formed on the substrate surface first is applied dissolved in a solvent that is silicone-based, and thus the hydrophobic agent that is applied afterwards is preferably a nonaqueous solvent, which is of the same group.

Examples of this nonaqueous solvent include paraffin-based hydrocarbons, fluorocarbon-based solvents, and solvents having silicone oil as a main component. Of these, solvents having silicone oil as a main component are preferable because such solvents are the same as the solvent for dissolving the chlorosilyl-group containing compound that is formed on the substrate surface first.

With regard to the method for applying the hydrophobic solution, it is necessary that the surface structure of the silica film with recesses and projections that is formed first is not destroyed. More specifically, it is preferable that the hydrophobic solution is adsorbed in the same manner as the chlorosilyl-group containing compound that is formed first.

To adsorb the hydrophobic solution, it is necessary for the substrate surface to be wetted by the hydrophobic solution for at least 0.1 seconds after the hydrophobic solution is applied.

With respect to the hydrophobic solution, it is sufficient that a single layer of the hydrophobic material is bonded, unlike the chlorosilyl-group containing compound of the silica film having recesses and projections that is formed first, and thus the period during which the substrate is wetted by the hydrophobic solution can be shorter than the period during which the chlorosilyl-group containing compound is allowed to adhere naturally to and form layers on the substrate surface.

However, when this period is less than 0.1 seconds, the hydrophobic material is not adequately adsorbed, and thus suitable hydrophobicity cannot be exhibited.

Examples of methods that allow such adsorption include flow coating methods, dip coating methods, curtain coating methods, spin coating methods, spray coating methods, bar coating methods, and immersion and adsorption methods. Of these methods, flow coating methods and spray coating methods are preferable because they allow efficient application.

Examples 2-1 to 2-11

First, while stirring, 2 g of heptadecafluorodecyltrichlorosilane ($CF_3(CF_2)_7(CH_2)_2SiCl_3$) were added to 98 g of decamethylcyclopentasiloxane, yielding a hydrophobicity providing agent.

This hydrophobicity providing agent was applied onto the surface of the glass substrates coated by a silica film having recesses and projections of the above Examples 1-1 to 1-11 at a relative humidity of 30% and at room temperature using flow coating, and for a period of one minute the glass substrates surface wetted by this hydrophobicity providing agent were left still. Then, the hydrophobic providing agent on the surfaces was completely washed away with ethanol and drying was allowed to occur naturally, yielding glass substrates provided with hydrophobicity according to Examples 2-1 to 2-11, respectively.

First, the hydrophobicity of the obtained glass substrates provided with hydrophobicity was evaluated by the contact angle of water. Using a contact angle meter "CA-DT" manufactured by Kyowa Interface Science Co., Ltd., 2 mg of water droplets were dropped onto the surface of the glass substrates, and the passive contact angle was measured. It should be noted that it was found that the greater the value of the contact angle, the better the passive hydrophobicity.

Next, the transparency of the films of the obtained glass substrates provided with hydrophobicity was evaluated by their haze values. The haze values were measured using a direct reading haze computer "HGM-2DM" manufactured by Suga Test Instruments Co., Ltd. It was found that the smaller the haze value, the higher the transparency of the film.

Then, the anti-abrasion properties of the films of the obtained glass substrates provided with hydrophobicity were evaluated. To test the anti-abrasion properties, a dry towel was attached to a reciprocating abrasion tester (manufactured by Shinto Scientific Co., Ltd.), and with a load of 125 g/cm$^2$, the glasses provided with hydrophobicity were slid back and forth 100 times and then the water contact angle of the glasses provided with hydrophobicity was measured under the same conditions as when measured prior to abrasion.

As shown in Table 2, the glass substrates provided with hydrophobicity that were obtained in Examples 2-1 to 2-11 exhibited an initial contact angle of 150° or more, which confirms that they have super hydrophobicity.

It should be noted that in all instances, the contact angle after the anti-abrasion testing was at least 100°. Here, although the glass substrates did not exhibit super hydrophobicity, they still exhibited sufficient normal hydrophobicity, confirming that they had excellent anti-abrasion properties.

Additionally, the haze values were substantially unchanged from those of the glass substrates coated by a silica film having recesses and projections obtained in Examples 1-1 to 1-11, with the haze value of each film being 1.0% or less, indicating that the films had high transparency.

TABLE 2

| Sample | Initial Contact Angle (°) | Contact Angle After Anti-Abrasion Testing (°) | Haze Value (%) |
|---|---|---|---|
| Example 2-1 | 157 | 110 | 0.3 |
| Example 2-2 | 155 | 105 | 0.3 |
| Example 2-3 | 154 | 105 | 0.2 |
| Example 2-4 | 156 | 112 | 0.4 |
| Example 2-5 | 153 | 103 | 0.2 |
| Example 2-6 | 156 | 113 | 0.4 |
| Example 2-7 | 155 | 108 | 0.2 |
| Example 2-8 | 156 | 111 | 0.5 |
| Example 2-9 | 157 | 112 | 0.3 |
| Example 2-10 | 157 | 105 | 0.2 |
| Example 2-11 | 158 | 115 | 0.7 |
| Comparative Example 1 | 120 | 113 | 0.2 |
| Comparative Example 2 | 123 | 101 | 3.8 |
| Comparative Example 3 | 91 | 76 | 0.2 |
| Comparative Example 4 | 114 | 105 | 0.1 |

Comparative Example 1

A solution for a silica film in which to form recesses and projections that was prepared in the same manner as in Example 1-1 was applied onto the surface of a cleaned glass substrate at a relative humidity of 30% and at room temperature using flow coating, and for a period of 0.5 seconds the glass substrate surface wetted by this solution was left still. Then, the solution for a silica film in which to form recesses and projections of the glass substrate surface was completely washed away with ethanol and drying was allowed to occur naturally, yielding a glass substrate coated with a silica film having recesses and projections. The surface of the glass substrate coated by the silica film having recesses and projections was provided with hydrophobicity in the same manner as in Examples 2-1 to 2-11, yielding a glass substrate provided with hydrophobicity.

The obtained glass substrate provided with hydrophobicity was evaluated in the same manner as in Examples 2-1 to 2-11, and it was found that the initial contact angle was 120°, indicating that the hydrophobicity was worse than that of Example 2.

Comparative Example 2

While stirring, 4.0 g of tetrachlorosilane ($SiCl_4$; made by Shin-Etsu Silicones) were added to 96.0 g of decamethylcyclopentasiloxane (KF-995; made by Shin-Etsu Silicones), yielding a solution for a silica film in which to form recesses and projections.

This solution for a silica film in which to form recesses and projections was applied onto the surface of a cleaned glass substrate at a relative humidity of 30% and at room temperature using flow coating, and for a period of five minutes the glass substrate surface wetted by this solution was left still. Then, the solution for a silica film in which to form recesses and projections of the glass substrate surface was completely washed away with ethanol and drying was allowed to occur naturally, yielding a glass substrate coated with a silica film having recesses and projections. The surface of the glass substrate coated by the silica film having recesses and projections was provided with hydrophobicity in the same manner as in Examples 2-1 to 2-11, yielding a glass substrate provided with hydrophobicity.

The obtained glass substrate provided with hydrophobicity was evaluated in the same manner as in Examples 2-1 to 2-11, and it was found that the initial contact angle was 123°, indicating that the hydrophobicity was worse than that of Examples 2. Moreover, white powder-like formations were observed in parts of the film and the haze value was 3.8%, and therefore the transparency was also worse.

Comparative Example 3

A glass substrate coated with a silica film having recesses and projections was obtained in the same manner as in Example 1-1, except that an isoparaffin-based hydrocarbon (Isozol 300, manufactured by Nippon Petrochemicals Co., Ltd.) was used in place of the decamethylcyclopentasiloxane of Example 1-1. The surface of this glass substrate coated by silica film having recesses and projections was provided with hydrophobicity in the same manner as in Examples 2-1 to 2-11, yielding a glass substrate provided with hydrophobicity.

The obtained glass substrate provided with hydrophobicity was evaluated in the same manner as in Examples 2-1 to 2-11, and it was found that the initial contact angle was 91°, indicating that the hydrophobicity was worse than that of Example 2.

Comparative Example 4

A glass substrate coated with a silica film having recesses and projections was obtained in the same manner as in Example 1-1, except that the conditions when the solution for a silica film in which to form recesses and projections prepared in the same manner as in Example 1-1 was applied onto the surface of a cleaned glass substrate were changed to a relative humidity of 10%. The surface of this glass substrate coated with a silica film having recesses and projections was provided with hydrophobicity in the same manner as in Examples 2-1 to 2-11, yielding a glass substrate provided with hydrophobicity.

The obtained glass substrate provided with hydrophobicity was evaluated in the same manner as in Examples 2-1 to 2-11, and it was found that the initial contact angle was 114°, indicating that the hydrophobicity was worse than that of Example 2.

Example 3

Providing Anti-Soiling Properties

Example 3

The same processes as those of Example 2-1 were performed, except that [methoxy(polyethyleneoxy)propyl] trimethoxysilane (manufactured by Chisso Inc., content: 90%, molecular weight: 460 to 590, number of ethyleneoxide units: 6 to 9) was used in place of the heptadecafluorodecyltrichlorosilane used in the examples for providing hydrophobicity, yielding a anti-soiling hydrophilic film.

The water wettability of the anti-soiling hydrophilic film that was obtained was observed, and it was confirmed that the water droplets wetted the film well and dispersed. The hydrophilicity was also evaluated by the contact angle of the water. The contact angle was too small to be measured precisely, but was less than approximately 5 degrees. From this, it was surmised that the contact angle of the anti-soiling film itself was also small and that the film exhibits excellent hydrophilicity in conjunction with the effects of the recesses and projections of the uneven silica film that was formed first.

Next, the anti-soiling property of this anti-soiling hydrophilic film was evaluated. Several drops of commercially available olive oil were dropped onto the anti-soiling hydrophilic film and let sit for thirty minutes at room temperature, and when the hydrophilic film was then washed with ethanol, the olive oil was completely removed, demonstrating that the hydrophilic film was anti-soiling.

Comparative Example 5

The anti-soiling properties of the glass substrate coated with silica film having recesses and projections according to Example 1-1 were evaluated in the same manner as in Example 3. It was found that some of the olive oil remained, demonstrating that the anti-soiling properties were worse than in Example 3.

The invention claimed is:
1. A film-coated article comprising:
a substrate; and
a film that contains silicon oxide as a main component and that is formed on a surface of the substrate,
wherein the film comprises minute projections and columnar projections, and the columnar projections are formed by local growth of the minute projections in the thickness direction of the film or formed with a plurality of minute particles that constitute the minute projections and that are stacked locally on the film, occupying not more than 50% of the surface of the film.
2. The film-coated article according to claim 1, wherein a diameter Dc and a height H of the columnar projections satisfy a relationship: $2Dc \leq H$.
3. The film-coated article according to claim 2, wherein the diameter Dc is 10 nm to 200 nm and the height H is at least 50 nm.
4. The film-coated article according to claim 3, wherein the minute projections have a diameter Dp of 5 nm to 200 nm.
5. The film-coated article according to claim 1, wherein a surface roughness of the film expressed as an arithmetic mean roughness value (Ra) is at least 10 nm, and a haze value of the film is 1% or less.

6. The film-coated article according to claim 1, wherein a contact angle of water that is measured by dropping 1 mg of water droplets on a surface of the film is 5° or smaller.

7. A functional-film-coated article comprising:
a film-coated article according to claim 1; and
a functional film formed on the film of the film-coated article, the functional film being either a hydrophobic film or an anti-soiling film.

8. The functional-film-coated article according to claim 7, wherein the hydrophobic film is an organic film containing a fluoroalkyl group.

9. The functional-film-coated article according to claim 7, wherein the anti-soiling film is an organic film containing a polyalkyleneoxy group.

10. The functional-film-coated article according to claim 7, wherein the functional film is a hydrophobic film, and a contact angle of water that is measured by dropping 2 mg of water droplets on a surface of the hydrophobic film is 150° or greater.

11. A method for producing a film-coated article comprising a substrate and a film that contains silicon oxide as a main component and that is formed on a surface of the substrate, the method comprising:
applying a solution containing a silicon-containing material to a surface of the substrate; and
keeping the substrate wetted with the solution for a time period sufficient for allowing formation of minute projections containing silicon supplied from the silicon-containing material and columnar projections on the surface of the substrate, the columnar projections being formed by local and irregular growth of the minute projections in a film thickness direction or being formed with a plurality of minute particles that constitute the minute projections and that are stacked locally on the surface of the film, occupying not more than 50% of the surface of the film.

12. The method for producing a film-coated article according to claim 11, wherein the silicon-containing material is a chlorosilyl group-containing compound.

13. The method for producing a film-coated article according to claim 11, wherein the solution further comprises a silicone oil.

14. The method for producing a film-coated article according to claim 11, wherein the state where the substrate is wetted with the solution is maintained for at least one second.

15. The method for producing a film-coated article according to claim 11, wherein the solution is applied to the substrate at a temperature of 10° C. to 40° C. and relative humidity of 15% to 60%.

16. A method for producing a functional-film-coated article comprising:
applying a solution for forming a functional film that is either a hydrophobic film or an anti-soiling film to a film of a film-coated article produced by the method of claim 11, the film of the film-coated article serving as a primer film.

17. The method for producing a functional-film-coated article according to claim 16, wherein the solution for forming a functional film is applied to the primer film without there being direct contact between the primer film and a device for applying the solution.

18. The method for producing a functional-film-coated article according to claim 16, wherein the solution for forming a functional film is applied while the substrate is wetted with the solution that is applied for forming the primer film.

* * * * *